(12) United States Patent
Bae et al.

(10) Patent No.: US 8,821,723 B2
(45) Date of Patent: Sep. 2, 2014

(54) PHOTOCATALYTIC REACTOR AND METHOD FOR TREATING GASEOUS POLLUTANTS USING THE SAME

(75) Inventors: Shin Tae Bae, Gyeonggi-do (KR); Soo Hyun Ha, Seoul (KR); Won Bae Lee, Seoul (KR); Dae Young Goh, Busan (KR)

(73) Assignee: Hyundai Motor Company, Seoul (KR)

( * ) Notice: Subject to any disclaimer, the term of this patent is extended or adjusted under 35 U.S.C. 154(b) by 176 days.

(21) Appl. No.: 13/293,349

(22) Filed: Nov. 10, 2011

(65) Prior Publication Data
US 2013/0026027 A1    Jan. 31, 2013

(30) Foreign Application Priority Data

Jul. 26, 2011   (KR) .................. 10-2011-0074322

(51) Int. Cl.
*B01J 19/12*   (2006.01)

(52) U.S. Cl.
USPC ............. 210/198.1; 422/186.3; 210/748.14; 210/748.15

(58) Field of Classification Search
USPC .................. 95/187; 422/186.3, 24
See application file for complete search history.

(56) References Cited

U.S. PATENT DOCUMENTS

| 5,779,912 A | 7/1998 | Gonzalez-Martin et al. |
| 5,933,702 A | 8/1999 | Goswami |
| 6,398,971 B1 * | 6/2002 | Butters et al. ............ 210/748.14 |

FOREIGN PATENT DOCUMENTS

| JP | 2000185219 A | 7/2000 |
| JP | 2003053145 A | 2/2003 |
| KR | 10-2000-0017691 | 4/2000 |
| KR | 10-0280275 | 11/2000 |
| KR | 20-0249122 | 9/2001 |
| KR | 10-2010-0085866 A | 7/2010 |

* cited by examiner

*Primary Examiner* — Duane Smith
*Assistant Examiner* — Cabrena Holecek
(74) *Attorney, Agent, or Firm* — Edwards Wildman Palmer LLP; Peter F. Corless

(57) ABSTRACT

The present invention provides a photocatalytic reactor and a method for treating gaseous pollutants using the same, which can decompose and remove gaseous pollutants such as volatile organic compounds (VOCs), odors, etc. as well as liquid pollutants using an environmentally friendly photocatalytic reaction. To this end, the present invention provides a photocatalytic reactor including: a solution tank to which a fluid containing gaseous pollutants to be treated is supplied through an inlet; a solution injector installed at the top of the inlet and injecting a gaseous pollutant solution into the fluid to be treated such that the gaseous pollutants of the fluid are dissolved; and a liquid photocatalytic treatment device receiving the gaseous pollutant solution, in which the gaseous pollutants of the fluid are dissolved and liquefied, from the solution tank and decomposing the liquefied gaseous pollutants of the fluid.

3 Claims, 5 Drawing Sheets

Gaseous pollutant solution (including fluid) from which pollutants are removed

Gaseous pollutant solution (including fluid) in which gaseous pollutants are dissolved

PRIOR ART

PRIOR ART

PHOTOCATALYTIC REACTOR AND METHOD FOR TREATING GASEOUS POLLUTANTS USING THE SAME

CROSS-REFERENCE TO RELATED APPLICATION

This application claims the benefit of Korean Patent Application No. 10-2011-0074322, filed Jul. 26, 2011, under 35 U.S.C. §119(a). The entire content of the aforementioned application is incorporated herein by reference in its entirety.

BACKGROUND (a) Technical Field

The present invention relates to a photocatalytic reactor. More particularly, it relates to a photocatalytic reactor and a method for treating gaseous pollutants using the same, which decomposes and removes gaseous pollutants such as volatile organic compounds (VOCs), odors, etc., as well as liquid pollutants using an environmentally friendly photocatalytic reaction.

(b) Background Art

With the rapid development of the global industry, the problem of environmental pollution has become more serious requiring strict regulations for pollution treatment. Moreover, the diversification in the types of pollution sources, and continued generation of new pollutants has created various approaches to more effectively solve the pollution problem.

A recently developed method includes a method for treating pollutants using a photocatalytic reaction, which is relatively unaffected by temperature, pH, etc., and does not require strict treatment conditions. Moreover, the method for treating pollutants using the photocatalytic reaction can use clean energy such as the light of the sun, etc., and thus has the advantages of being environment-friendly and energy efficient.

The currently used photocatalytic reaction will be discussed briefly below. When light energy from the sun or any other light source is applied to a photocatalyst, electrons and holes are generated in the photocatalyst and migrate to the surface of the photocatalyst. The electrons and holes migrating to the surface of the photocatalyst come into contact with pollutants to be treated and cause chemical oxidation-reduction reactions, thereby decomposing the pollutant molecules.

An organic pollutant decomposition device using the photocatalytic reaction is a nature-friendly pollution reduction device and has enormous potential for development, and thus the interest in the photocatalytic reactor has increased.

Conventional photocatalytic reactors are classified as a suspended photocatalytic reactor as shown in FIG. 1 and a fixed photocatalytic reactor as shown in FIG. 2.

The suspended photocatalytic reactor 10 is a device for decomposing liquid pollutants and, as shown in FIG. 1, comprises a light source 11 for supplying light energy, a photoreactive treatment tank 12 for accommodating a fluid 14 to be subjected to pollutant removal treatment such as wastewater, dye solution, etc., and a photocatalytic powder 13 introduced and dispersed into the fluid 14 to be treated in the photoreactive treatment tank 12.

The suspended photocatalytic reactor 10 can utilize much larger surface area of the photocatalytic powder 10 in the photocatalytic reaction and thus has the advantage of high treatment efficiency compared to the fixed photocatalytic reactor. However, the photocatalytic powder 10 is not fixed to gaseous pollutants such as volatile organic compounds (VOCs), odors, etc., during treatment. Therefore, treatment of gaseous pollutants is not possible with a suspended photocatalytic reactor 10.

The fixed photocatalytic reactor 20 is a device for decomposing liquid and gaseous pollutants and, as shown in FIG. 2, comprises a light source 21 for supplying light energy, a photoreactive treatment tank 22 through which a fluid 26 to be subjected to pollutant removal treatment, including gaseous pollutants such as VOCs, odors, etc., and liquid pollutants such as wastewater, dye solution, etc., passes, and a photocatalyst-coated tube 25 on which a photocatalyst is coated and fixed.

The photoreactive treatment tank 22 includes an inlet 23 through which the fluid 26 to be treated is introduced and an outlet 24 through which the fluid 26 being in contact with the photocatalyst is finally discharged such that the fluid 26 introduced through the inlet 23 is in contact with the photocatalyst fixed on the photocatalyst-coated tube 25 to be decomposed and then discharged through the outlet 24.

Since the photocatalyst is fixed on the photocatalyst-coated tube 25 in the fixed photocatalytic reactor 20, it is not necessary to recover the photocatalyst separately. Moreover, even in the case where a sealed space for maintaining the contact between the photocatalyst and the gaseous pollutants is to be treated or the flow rate of the fluid 26 to be treated is small, it is possible to treat the gaseous pollutants. However, compared to the suspended photocatalytic reactor 10, the reaction area of the photocatalyst is limited to the coated area of the photocatalyst-coated tube 25. Thus, when liquid and gaseous pollutants having high flow rate and velocity are treated (e.g., in a factory), the reaction time between the photocatalyst and the gaseous pollutants is very short, which makes it difficult to treat the pollutants, thereby reducing the treatment efficiency.

The current invention addresses the current drawbacks by providing an apparatus to treat gaseous pollutants in an effective, efficient, and environmentally friendly manner.

SUMMARY OF THE DISCLOSURE

The present invention provides a photocatalytic reactor and a method for treating gaseous pollutants using the same, which can decompose and remove gaseous pollutants as well as liquid pollutants, by dissolving the gaseous pollutants and allowing the dissolved gaseous pollutant to react with a photocatalyst.

In one aspect, the present invention provides a photocatalytic reactor comprising: a solution tank to which a fluid containing gaseous pollutants to be treated is supplied through an inlet; a solution injector installed at a top of the inlet which injects a gaseous pollutant solution into the fluid to be treated such that the gaseous pollutants of the fluid are dissolved; and a liquid photocatalytic treatment device receiving the gaseous pollutant solution, in which the gaseous pollutants of the fluid from the solution tank, are dissolved and liquefied, then the liquefied gaseous pollutants are decomposed.

In one embodiment, the photocatalytic reactor further comprises a porous filler provided at a bottom of the solution injector which increases contact time between the gaseous pollutants of the fluid and the gaseous pollutant solution.

In another embodiment, the photocatalytic reactor further comprises a circulation means provided between the liquid photocatalytic treatment device and the solution injector, which circulates the gaseous pollutant solution.

In still another embodiment, the gaseous pollutant solution may comprise hydrogen peroxide or dissolved oxygen.

In another aspect, the present invention provides a method for treating gaseous pollutants, the method comprising the steps of: (i) adding a fluid containing gaseous pollutants to be treated to a solution tank; (ii) injecting a gaseous pollutant solution into the solution tank such that the gaseous pollutant solution comes into contact with the gaseous pollutants of the fluid; and (iii) allowing the gaseous pollutant solution of step (ii), in which the gaseous pollutants of the fluid are dissolved and liquefied, to react with a photocatalyst such that the liquefied gaseous pollutants of the fluid are decomposed.

In one embodiment, the method further comprises the step wherein, in step (ii), in the injecting of the gaseous pollutant solution into the solution tank, the gaseous pollutant solution injected into the solution tank is allowed to pass through a porous filler to increase the contact time between the gaseous pollutants of the fluid and the gaseous pollutant solution.

In another embodiment, the method further comprises the step of wherein, in step (iii), the liquefied decomposed gaseous pollutants of the fluid are circulated to an injector of the solution tank to be injected again into the solution tank.

In certain embodiments, the gaseous pollutant solution comprises hydrogen peroxide or dissolved oxygen.

Other aspects and preferred embodiments of the invention are discussed infra.

BRIEF DESCRIPTION OF THE DRAWINGS

The above and other features of the present invention will now be described in detail with reference to certain exemplary embodiments thereof. The drawings are meant for illustration purposes only, and are not meant to limit the invention.

Figure 1:
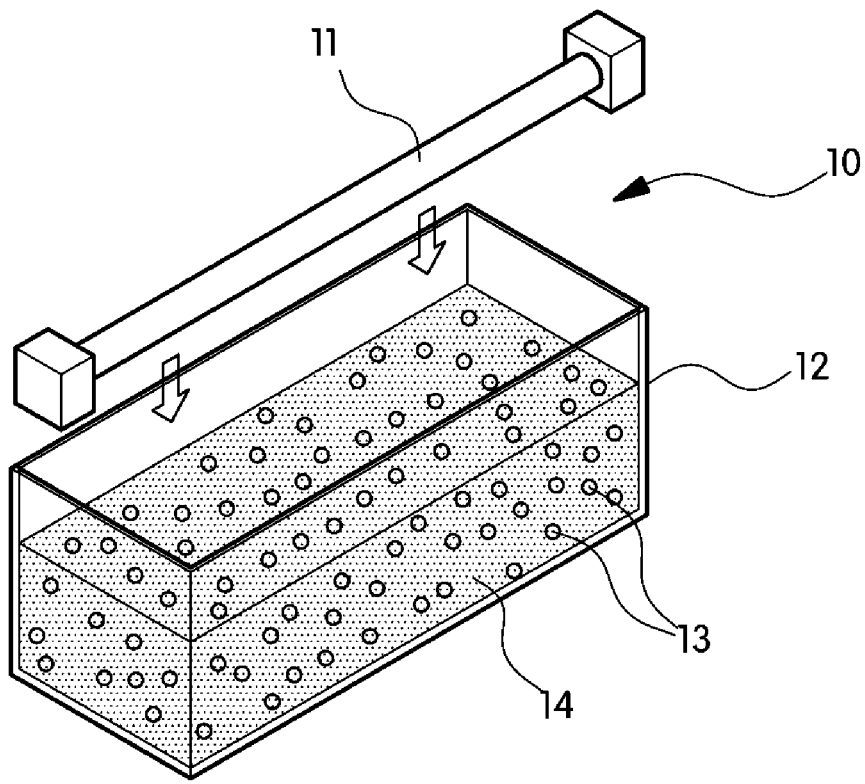
FIG. 1 is a schematic diagram showing a conventional suspended photocatalytic reactor.
Figure 2:
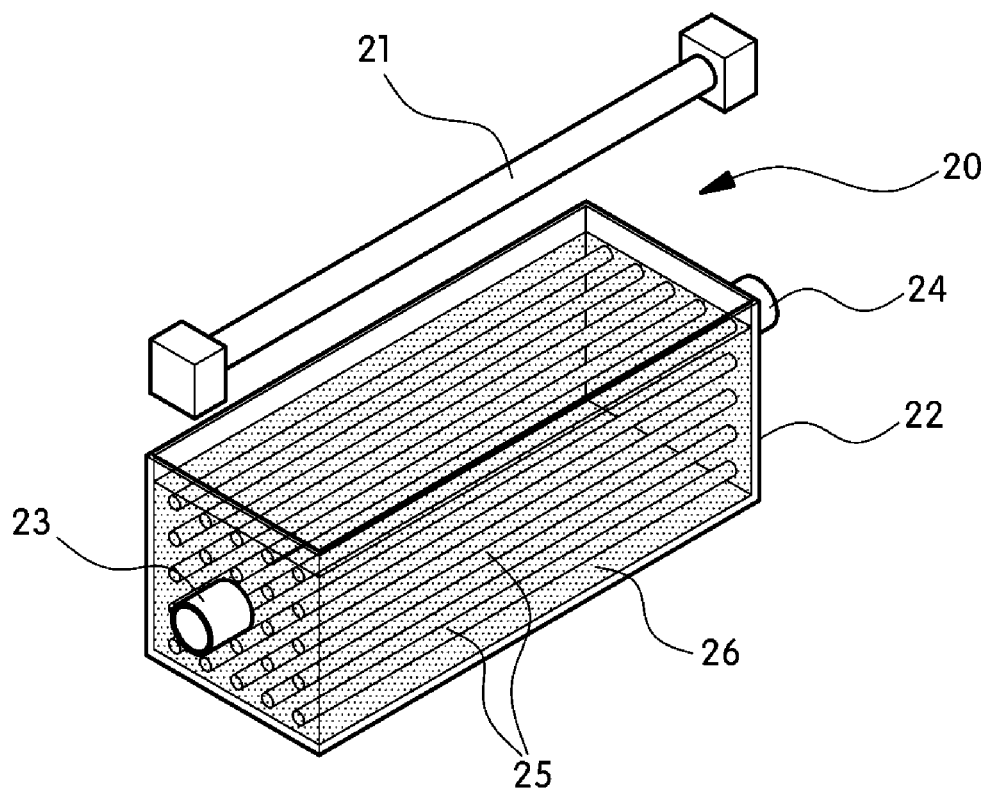
FIG. 2 is a schematic diagram showing a conventional fixed photocatalytic reactor.

Reference numerals set forth in the Drawings includes reference to the following elements as further discussed below:

| | |
|---|---|
| 100: solution tank | 101: inlet |
| 102: outlet | 103: solution injector |
| 104: porous filler | |
| 105: liquid photocatalytic treatment device | |
| 106: circulation pump | 107: pipe |
| 110: photoreactive treatment tank | 111: inlet |
| 112: outlet | 120: optical fiber |
| 130: light source | 140: partial partition |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a photocatalytic reactor and a method for treating gaseous pollutants using the same, wherein the reactor can decompose and remove gaseous pollutants such as volatile organic compounds (VOCs), odors, etc. as well as liquid pollutants by allowing a fluid (to be subjected to pollutant removal treatment or odor removal treatment) to react with a photocatalyst using light energy.

In particular, the photocatalytic reactor of the present invention is obtained in part by improving a conventional suspended photocatalytic reactor (see FIG. 1), which is not readily able to decompose gaseous pollutants because the photocatalyst is not fixed. In certain embodiments, the invention provides a photocatalytic reactor wherein gaseous pollutants of a fluid to be treated are dissolved and liquefied in a gaseous pollutant solution, and the resulting solution is treated using a liquid photocatalytic treatment device having high removal efficiency of liquid pollutants. The reactor of the invention provides the advantage of using a photocatalytic reaction between the photocatalyst and the gaseous pollutants of a fluid having high flow rate and velocity, providing for the treatment of gaseous non-biodegradable pollutants.

Figure 3:
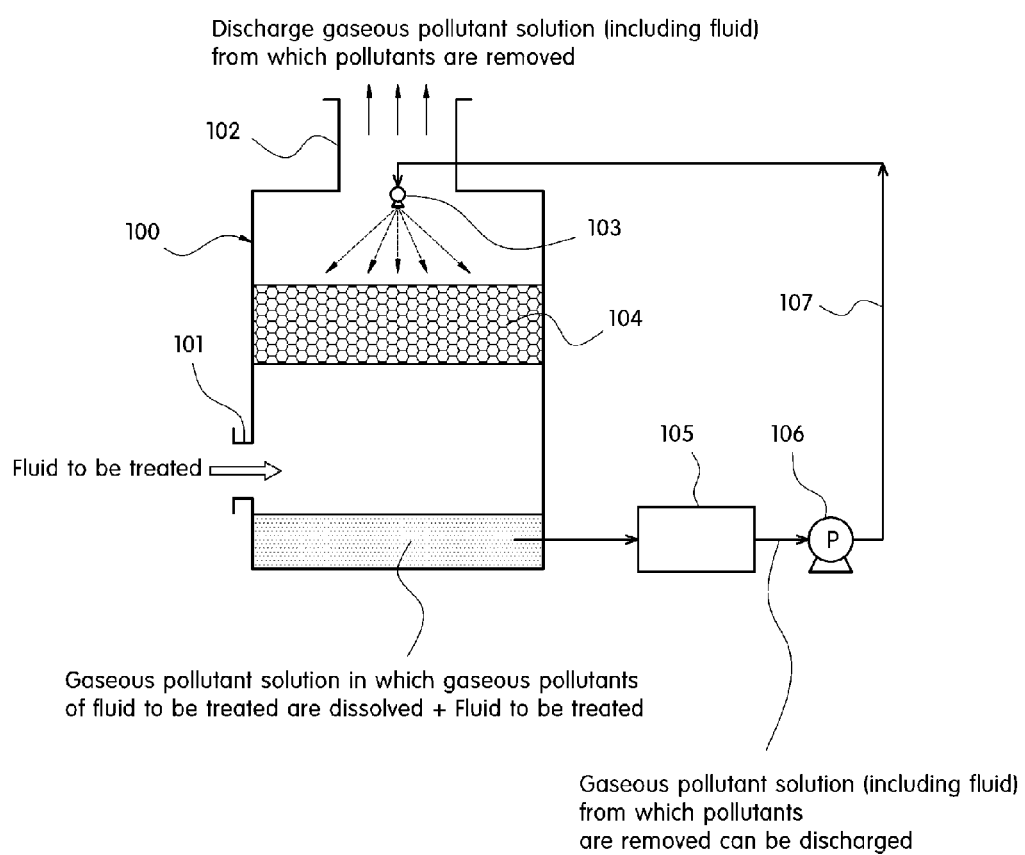
FIG. 3 is a schematic diagram showing the configuration of a photocatalytic reactor in accordance with a preferred embodiment of the present invention.

As shown in FIG. 3, the photocatalytic reactor of the present invention comprises a solution tank 100 to which a fluid from which gaseous and liquid pollutants are to be removed is supplied, a solution injector 103 for injecting a gaseous pollutant solution into the fluid to be treated in the solution tank 100, and a liquid photocatalytic treatment device 105 in which the pollutants of the fluid are reacted with a photocatalyst and decomposed.

The solution tank 100 is provided with an inlet 101 through which the fluid to be treated is introduced and an outlet 102 through which the fluid, from which gaseous and liquid pollutants are decomposed and removed by the reaction with the photocatalyst, is discharged.

The solution tank 100 is a liquefaction treatment tank, in which the gaseous pollutants contained in the fluid supplied through the inlet 101 are liquefied, and the solution injector 103 is installed at the top of the inlet 101.

The solution injector 103 comprises an injection nozzle, for example, and injects the gaseous pollutant solution into the fluid introduced through the inlet 101 from the top of the inlet 101 such that the gaseous pollutants of the fluid to be treated are in contact with the gaseous pollutant solution.

Thus, the gaseous pollutants of the fluid to be treated are dissolved and liquefied in the gaseous pollutant solution.

In certain embodiments, the gaseous pollutant solution is a liquid containing a compound which can produce OH radicals. In certain embodiments, the liquid is water. In other embodiments, the compound that produces OH radicals is hydrogen peroxide, dialkyl peroxide, alkyl aryl peroxide, diaryl peroxide, or dissolved oxygen. In certain embodiments, the gaseous pollutant solution is a liquid containing hydrogen peroxide or dissolved oxygen which can produce OH radicals.

In a further embodiment, the gaseous pollutant solution is oxygenated water or oxygen-enriched water. In certain embodiments, the oxygenated water comprises about 99.00 to about 99.99 wt % water and 0.01 to 1.00 wt % hydrogen peroxide. In certain embodiments, the oxygenated water comprises about 99.00 to about 99.25 wt % water and 0.75 to 1.00 wt % hydrogen peroxide. In certain embodiments, the oxygenated water comprises about 99.25 to about 99.50 wt % water and 0.50 to 0.75 wt % hydrogen peroxide. In certain embodiments, the oxygenated water comprises about 99.50 to about 99.75 wt % water and 0.25 to 0.50 wt % hydrogen peroxide. In certain embodiments, the oxygenated water comprises about 99.75 to about 99.99 wt % water and 0.01 to 0.25 wt % hydrogen peroxide.

In other embodiments, the oxygen-enriched water may contain 99.99 to 99.00 wt % water and 0.01 to 1.00 wt % dissolved oxygen. In certain embodiments, the oxygenated water comprises about 99.00 to about 99.25 wt % water and 0.75 to 1.00 wt % dissolved oxygen. In certain embodiments, the oxygenated water comprises about 99.25 to about 99.50 wt % water and 0.50 to 0.75 wt % dissolved oxygen. In certain embodiments, the oxygenated water comprises about 99.50 to about 99.75 wt % water and 0.25 to 0.50 wt % dissolved oxygen. In certain embodiments, the oxygenated water comprises about 99.75 to about 99.99 wt % water and 0.01 to 0.25 wt % dissolved oxygen.

In another embodiment, the OH radicals cause an additional oxidation reaction along with the oxidation reaction of the photocatalyst in the liquid photocatalytic treatment device. Moreover, when the hydrogen peroxide or dissolved oxygen of the gaseous pollutant solution produces OH radicals, the OH radicals act as electron acceptors of the photocatalyst to inhibit the recombination of electrons and holes produced. As a result, OH radical production is greatly increased by holes, which significantly promotes the oxidation reaction of the photocatalyst.

In various embodiments, a porous filler 104 is provided at the bottom of the solution injector 103 in the solution tank 100.

The porous filler 104 is disposed between the solution injector 103 and the inlet 101 such that the gaseous pollutant solution injected from the solution injector 103 passes through the porous filler 104 before contacting the gaseous pollutants of the fluid to be treated, increasing the contact time between the gaseous pollutants of the fluid to be treated and the gaseous pollutant solution.

As the contact time between the gaseous pollutants of the fluid to be treated and the gaseous pollutant solution is increased by the porous filler 104 in the above-described manner, the dissolution efficiency of the gaseous pollutants is increased, thereby increasing the removal efficiency of the gaseous pollutants of the fluid to be treated.

In certain embodiments, the porous filler 104 comprises a typical filler material having a plurality of pores.

In another embodiment, the gaseous pollutant solution (in which the fluid to be treated is mixed and the gaseous pollutants of the fluid to be treated are dissolved) placed at the bottom of the solution tank 100 is treated by the liquid photocatalytic treatment device 105 to reduce the pollutants.

In certain embodiments, the liquid photocatalytic treatment device 105 is connected to the solution tank 100 through a pipe, etc. to receive the gaseous pollutant solution placed at the bottom of the solution tank 100 or may be mounted in the solution tank 100 to receive the solution at the bottom of the solution tank 100.

Here, the gaseous pollutant solution introduced into the liquid photocatalytic treatment device 105 is a mixed solution of the gaseous pollutants dissolved and liquefied in the solution and the fluid introduced into the solution tank 100.

As mentioned above, the liquid photocatalytic treatment device 105 is a type of pollutant removal device for decomposing the pollutants of the fluid to be treated by the reaction with the photocatalyst, and functions to decompose and reduce the gaseous pollutants of the fluid dissolved and liquefied in the gaseous pollutant solution, as well as the liquid pollutants of the fluid to be treated.

Figure 4:
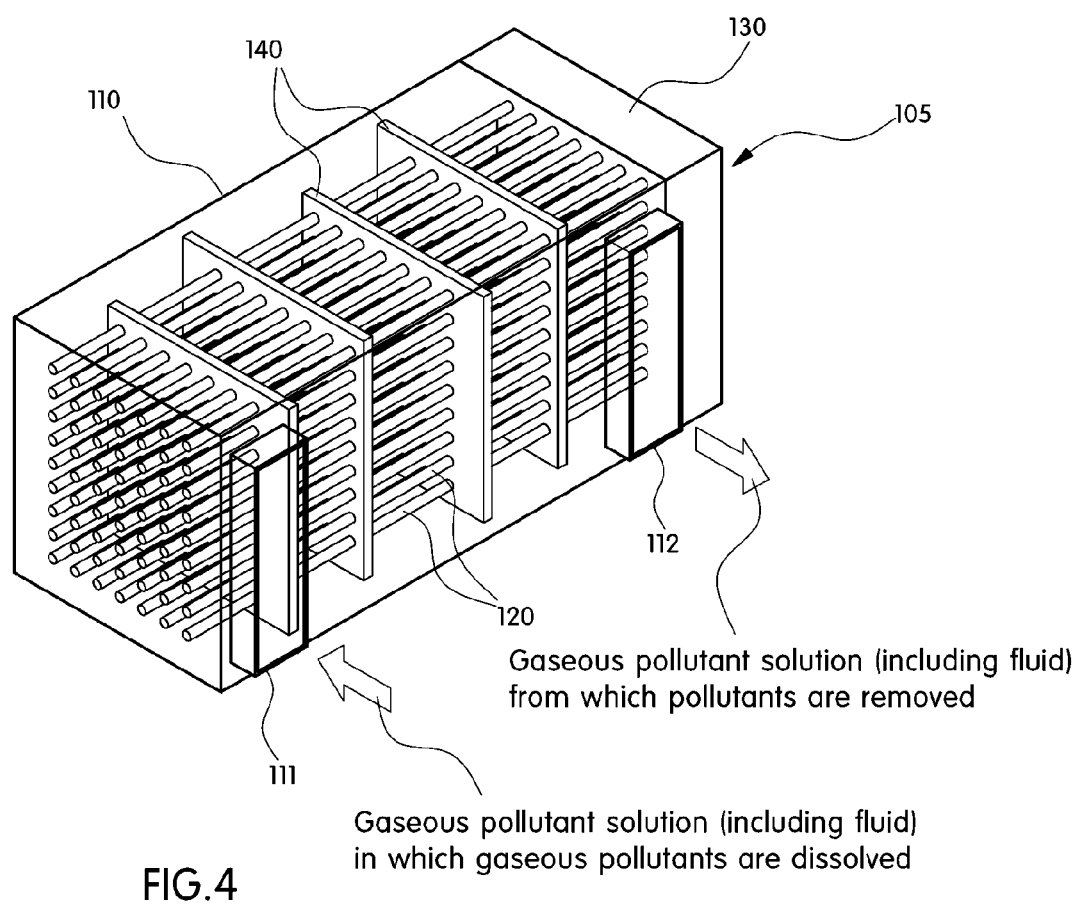
FIG. 4 is a schematic diagram showing the configuration of a liquid photocatalytic treatment device in accordance with a preferred embodiment of the present invention.

In the present invention, the liquid photocatalytic treatment device 105 may be any device capable of reducing the liquid pollutants of the fluid to be treated and may preferably be a liquid photocatalytic treatment device having a high efficiency as shown in FIG. 4.

The gaseous pollutant solution from which the pollutants are removed by the photocatalyst in the liquid photocatalytic treatment device 105 is circulated to the solution injector 103 by a circulation means.

The circulation means is interposed between the liquid photocatalytic treatment device 105 and the solution injector 103 and may comprise a circulation pump 106 connected to (an inlet of) the liquid photocatalytic treatment device 105 and circulates the gaseous pollutant solution by the operation of the pump and a pipe 107, which is connected between the circulation pump 106 and the solution injector 103.

The gaseous pollutant solution (mixed with the fluid to be treated) from which the pollutants are reduced, is circulated by the circulation means to be reused to dissolve the gaseous pollutants. As a result, it is possible to decompose a fluid newly introduced to be treated and, at the same time, to re-treat the fluid treated and, as the circulation process is performed several times (i.e., as the process of treating the fluid is repeatedly performed), it is possible to increase the reaction time for reducing the pollutants between the fluid and the photocatalyst, thereby increasing the removal efficiency of the pollutants of the fluid.

The gaseous pollutant solution from which the pollutants are sufficiently removed by the repeated pollutant removal treatment may be recovered through the outlet 102 of the solution tank 100 by the circulation means and discharged to the outside or may be treated by the liquid photocatalytic treatment device 105 and directly discharged to the outside through an outlet 112 of the liquid photocatalytic treatment device 105.

Otherwise, after the gaseous pollutant solution from which the pollutants are sufficiently removed is treated by the liquid photocatalytic treatment device 105 to remove the pollutants, a portion of the gaseous pollutant solution may be discharged to the outside through the outlet 112 of the liquid photocatalytic treatment device 105 and the other portion may be recovered to the solution injector 103 of the solution tank 100 through the circulation means to be reused and re-treated.

Figure 5:
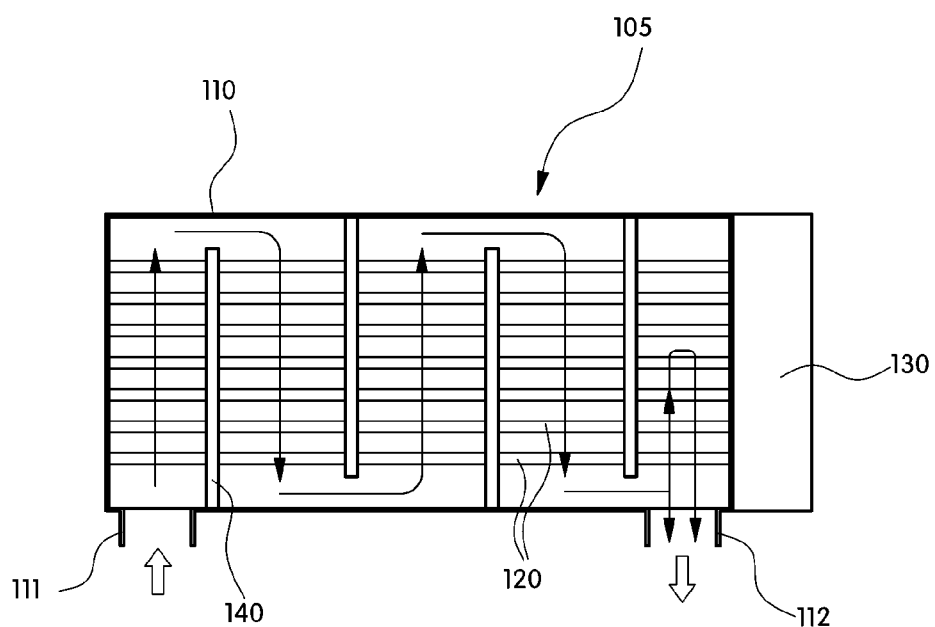
FIG. 5 is a plan view of the liquid photocatalytic treatment device of FIG. 4.

Referring to FIGS. 4 and 5, the liquid photocatalytic treatment device 105 may comprise a photoreactive treatment tank 110 through which the fluid supplied through an inlet 111 passes through the inner space and is then discharged through the outlet 112, a side-emitting optical fiber 120 fixed in the photoreactive treatment tank 110 by a support means, a photocatalyst (not shown) coated on the surface of the side-emitting optical fiber 120, and a light source 130 for supplying light to the inside of the side-emitting optical fiber 120 such that light is emitted from the side of the optical fiber 120.

The inlet 111 of the photoreactive treatment tank 110 is provided at one end and the outlet 112 is provided at the other end. A plurality of optical fibers 120 are arranged parallel to each other at regular intervals and fixed between the inlet 111 and the outlet 112.

Preferably, a plurality of side-emitting optical fibers 120 are arranged at regular intervals in the photoreactive treatment tank 110 in such a manner that one end of each optical fiber is fixed toward the inlet 111 and the other end is fixed toward the outlet 112.

A partial partition 140 is provided in the photoreactive treatment tank 110 as a support means for supporting the optical fibers 120.

The partial partition 140 is arranged in a direction perpendicular to the longitudinal direction of the optical fibers 120 between the inlet 111 and the outlet 112 in the photoreactive treatment tank 110. Preferably, a plurality of partial partitions 140 are arranged at regular interval in the longitudinal direction of the optical fibers 120 such that the optical fibers 120 are inserted and fixed through holes of the partial partitions 140. As a result, the optical fibers 120 laterally penetrate the partial partitions 140.

Here, one end of each partial partition 140 is fixed to one side of the photoreactive treatment tank 110 and the other end has an opening through which the fluid to be treated passes. Preferably, the openings of the partial partitions 140 are arranged alternately in the longitudinal direction of the optical fibers 120 such that a zigzag flow path is formed in the photoreactive treatment tank 110.

As a result, the zigzag flow path is formed from the inlet 111 to the outlet 112 in the inner space of the photoreactive treatment tank 110, and each partial partition 140 acts as a support means for supporting the optical fibers 120, as a spacing means for spacing the optical fibers 120, and as a flow path forming means for forming the flow path through which the fluid to be treated flows.

When the partial partitions 140 are arranged in a direction perpendicular to the longitudinal direction of the optical fibers 120 in the above-described manner, the fluid to be treated passes through the optical fibers 120 in a direction perpendicular to the longitudinal direction of the optical fibers 120 and moves along the zigzag flow path in the inner space of the photoreactive treatment tank 110. Thus, it is possible to increase the flow path of the fluid under treatment and, at the same time, to make the best use of the large area of the optical fibers 120, which increases the reaction time between the fluid under treatment and the photocatalyst, thereby maximizing the treatment efficiency.

Since the optical fibers 120 are arranged lengthwise between the inlet 111 and the outlet 112, the fluid introduced through the inlet 111 sequentially passes through and makes contact with the photocatalyst-coated optical fibers 120 in the longitudinal direction, while flowing along the predetermined flow path in the photoreactive treatment tank 110 toward the outlet 112, thereby maximizing the reaction area.

Next, a method for treating gaseous pollutants using the photocatalyst reactor in accordance with another preferred embodiment of the present invention will be described.

First, a fluid containing gaseous pollutants to be treated is supplied to a solution tank 100. Before the fluid supplied to the solution tank 100 is introduced into a liquid photocatalytic treatment device 105 or at the same time when the fluid is introduced into the solution tank 100, a gaseous pollutant solution is injected into the solution tank 100 using a solution injector 103.

The gaseous pollutant solution injected into the solution tank 100 passes through a porous filler 104 before contacting the gaseous pollutants of the fluid to be treated, wherein the contact time between the injected gaseous pollutant solution and the gaseous pollutants of the fluid under treatment is increased such that the gaseous pollutants are efficiently dissolved and liquefied in the gaseous pollutant solution.

In such a step, the gaseous pollutant solution injected into the solution tank 100 comes into contact with the gaseous pollutants of the fluid to be treated such that the gaseous pollutants of the fluid are dissolved and liquefied.

The liquefied gaseous pollutants are mixed with the gaseous pollutant solution and the fluid to be treated and is introduced into the liquid photocatalytic treatment device 105.

The liquid photocatalytic treatment device 105 decomposes the liquefied gaseous pollutants by allowing the gaseous pollutant solution (mixed with the liquefied gaseous pollutants and the fluid to be treated) fed from the solution tank 100, to react with the photocatalyst, thereby removing the gaseous and liquid pollutants.

The gaseous pollutant solution (from which the pollutants are removed) discharged through an outlet of the liquid photocatalytic treatment device 105 may be recovered from the solution injector 103 through a circulation means and injected into another fluid to be treated introduced into the solution tank 100, thereby liquefying the gaseous pollutants of the corresponding fluid.

The fluid, from which the gaseous and liquid pollutants are sufficiently removed by repeating the pollutant removal treatment, is discharged to the outside through the outlet 112 of the liquid photocatalytic treatment device 105 or through the discharge 102 of the solution tank 100.

As described above, according to the photocatalytic reactor and the method for treating gaseous pollutants using the same of the present invention, it is possible to significantly increase the removal efficiency of pollutants, especially, gaseous pollutants, and thus it is possible to efficiently decompose and remove the gaseous non-biodegradable pollutants from the fluid having high flow rate and velocity as well as the liquid pollutants contained in the fluid.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The contents of all references (including literature references, issued patents, published patent applications, and co-pending patent applications) cited throughout this application are hereby expressly incorporated herein in their entireties by reference.

What is claimed is:

1. A photocatalytic reactor comprising:
   a solution tank to which a fluid containing gaseous pollutants to be treated is supplied through an inlet;
   a solution injector installed above the inlet which injects a gaseous pollutant solution into the fluid to be treated such that the gaseous pollutants of the fluid are dissolved; and
   a liquid photocatalytic treatment device receiving the gaseous pollutant solution, in which the gaseous pollutants of the fluid from the solution tank are dissolved and liquefied, then the liquefied gaseous pollutants are decomposed,
   wherein a porous filler is provided below the solution injector to increase contact time between the gaseous pollutants of the fluid and the gaseous pollutant solution,
   wherein a plurality of optical fibers are arranged parallel to each other at regular intervals and fixed between an inlet and an outlet of the liquid photocatalytic treatment device, and
   wherein a plurality of partial partitions are arranged at regular interval in a direction longitudinal to the optical fibers such that the optical fibers are inserted and fixed through holes of the partial partitions, and one end of each partial partition is fixed to one side of the photocatalytic treatment device and the other end has an opening through which the fluid to be treated passes.

2. The photocatalytic reactor of claim 1, further comprising a circulation means provided between the liquid photocatalytic treatment device and the solution injector, which circulates the gaseous pollutant solution.

3. The photocatalytic reactor of claim 1, wherein the gaseous pollutant solution comprises hydrogen peroxide or dissolved oxygen.

* * * * *